(12) United States Patent
Shen

(10) Patent No.: US 10,547,086 B2
(45) Date of Patent: Jan. 28, 2020

(54) SECONDARY BATTERY

(71) Applicant: Lumimodule Optical Corporation, Taipei (TW)

(72) Inventor: Meng-Wei Shen, Taipei (TW)

(73) Assignee: LUMIMODULE OPTICAL CORPORATION, Taipei (TW)

( * ) Notice: Subject to any disclaimer, the term of this patent is extended or adjusted under 35 U.S.C. 154(b) by 278 days.

(21) Appl. No.: 15/402,061

(22) Filed: Jan. 9, 2017

(65) Prior Publication Data

US 2017/0207495 A1     Jul. 20, 2017

(30) Foreign Application Priority Data

Jan. 19, 2016   (TW) .............................. 105101653 A

(51) Int. Cl.

| | |
|---|---|
| *H01M 10/46* | (2006.01) |
| *H01M 10/42* | (2006.01) |
| *H02J 50/10* | (2016.01) |
| *H01M 2/30* | (2006.01) |
| *H01M 2/34* | (2006.01) |
| *H02J 7/02* | (2016.01) |
| *H02J 7/14* | (2006.01) |

(52) U.S. Cl.
CPC ......... *H01M 10/4257* (2013.01); *H01M 2/30* (2013.01); *H01M 2/348* (2013.01); *H01M 10/46* (2013.01); *H02J 7/025* (2013.01); *H02J 7/1415* (2013.01); *H02J 50/10* (2016.02); *H01M 2200/103* (2013.01)

(58) Field of Classification Search
None
See application file for complete search history.

(56) References Cited

U.S. PATENT DOCUMENTS

| | | | |
|---|---|---|---|
| 6,608,464 B1 * | 8/2003 | Lew ......................... | B60K 1/04 320/107 |
| 2011/0127954 A1 * | 6/2011 | Walley ................ | H01M 2/0267 320/108 |
| 2012/0293120 A1 * | 11/2012 | Jang ..................... | H01Q 1/2225 320/108 |
| 2013/0244062 A1 * | 9/2013 | Teramoto .......... | H01M 10/4257 429/7 |
| 2015/0333547 A1 * | 11/2015 | Na ........................ | H02J 7/0029 361/93.1 |

* cited by examiner

*Primary Examiner* — Tracy M Dove
(74) *Attorney, Agent, or Firm* — Guice Patents PLLC

(57) ABSTRACT

A secondary battery including: at least one first metal plate serving as a positive terminal; at least one second metal plate serving as a negative terminal; a separator material disposed between the at least one first metal plate and the at least one second metal plate for separating a positive terminal material on the at least one first metal plate and a negative terminal material on the at least one second metal plate; a liquid electrolyte; and an integrated circuit for controlling a wireless communication of RFID, WIFI, NFC, Blue-tooth, or SRI, where, the at least one first metal plate and/or the at least one second metal plate has formed thereon a coil pattern so that an energy transfer can take place between the positive terminal and the negative terminal, and the integrated circuit controls the energy transfer.

2 Claims, 7 Drawing Sheets

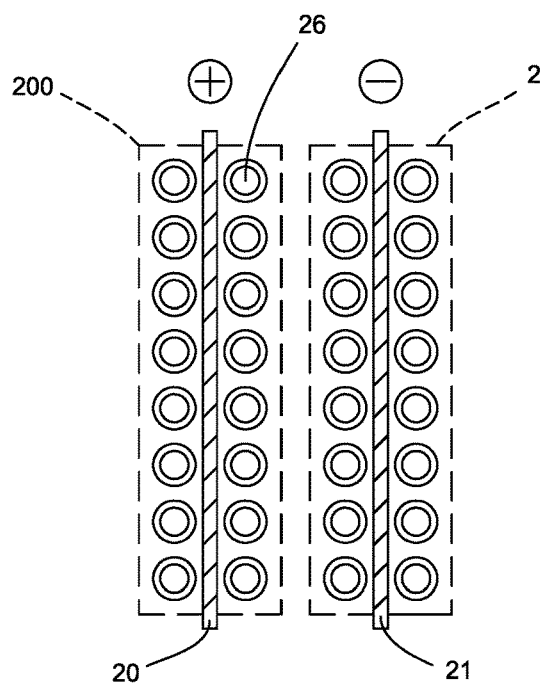
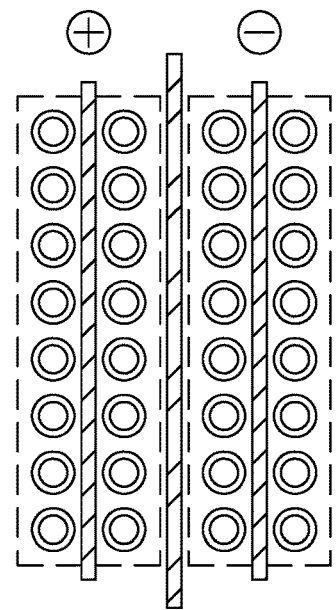
FIG. 5(a)  FIG. 5(b)
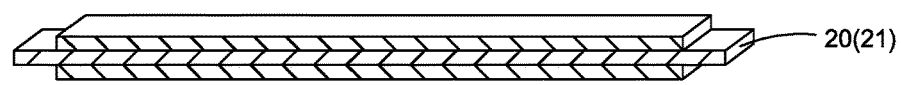
FIG. 6(a)
FIG. 6(b)
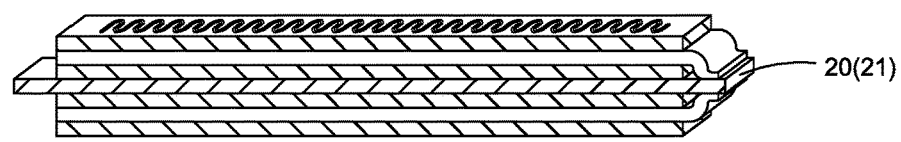
FIG. 6(c)

ure, and FIG. 6(*c*) illustrates a first (or second) metal plate
SECONDARY BATTERY

BACKGROUND OF THE INVENTION

Field of the Invention

The present invention relates to a secondary battery.

Description of the Related Art

Currently there are a variety of secondary batteries differing in capacity and performance due to different materials they use. The inventor of the present invention proposes a secondary battery outperforming conventional secondary batteries both in capacity and performance.

SUMMARY OF THE INVENTION

The objective of the present invention is to provide a secondary battery.

According to one embodiment of the present invention, a secondary battery includes: at least one first metal plate serving as a positive terminal; at least one second metal plate serving as a negative terminal; a separator material disposed between the at least one first metal plate and the at least one second metal plate for separating a positive terminal material on the at least one first metal plate and a negative terminal material on the at least one second metal plate; a liquid electrolyte; and an integrated circuit for controlling a wireless communication of RFID, WIFI, NFC, Blue-tooth, or SRI, wherein, the at least one first metal plate and/or the at least one second metal plate has formed thereon a coil pattern selected from a group consisting of an antenna coil pattern, a charging and discharging coil pattern for electromagnetic wave induction or electric field induction, an acoustic antenna coil pattern, a charging and discharging coil pattern for audio wave induction, and a charging and discharging coil pattern for X-ray induction or laser light induction, so that an energy transfer can take place between the positive terminal and the negative terminal, and wherein, the integrated circuit controls the energy transfer.

BRIEF DESCRIPTION OF THE DRAWINGS

FIG. 5(*a*) illustrates a secondary battery without a separator material according to an embodiment of the present invention and FIG. 5(*b*) illustrates a secondary battery having a separator material according to an embodiment of the present invention.

FIG. 6(*a*) illustrates a first (or second) metal plate of the present invention having a 1D (one deposition layer) structure, FIG. 6(*b*) illustrates a first (or second) metal plate of the present invention having a 2D (two deposition layers) structure, and FIG. 6(*c*) illustrates a first (or second) metal plate of the present invention having a 3D (three deposition layers) structure.

DETAILED DESCRIPTION OF THE PREFERRED EMBODIMENTS

Figure 1:
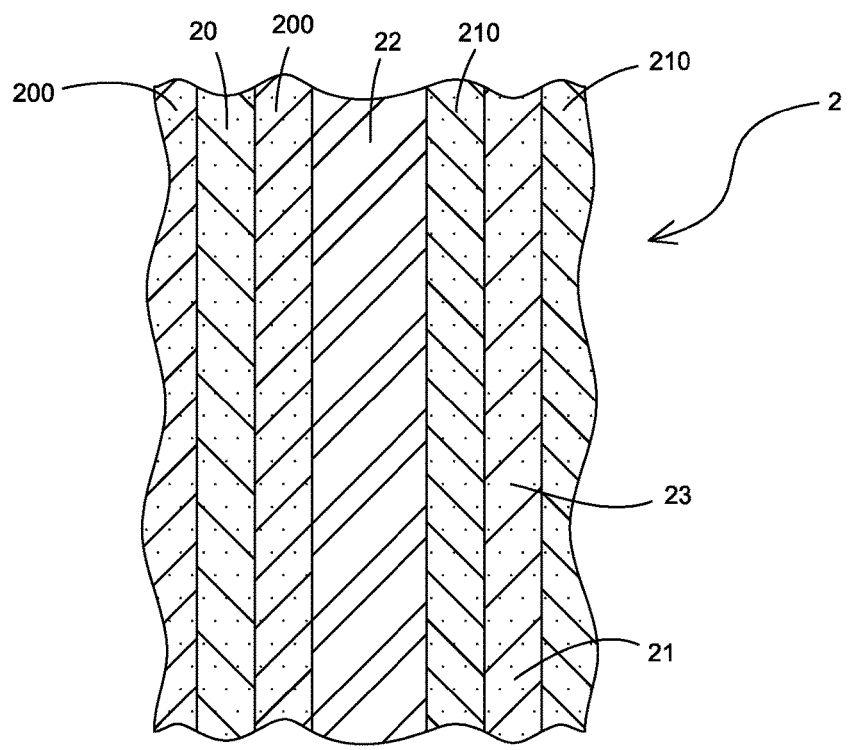
FIG. 1 illustrates an enlarged view of part of a secondary battery according to a first embodiment of the present invention.

In the detailed descriptions of preferred embodiments hereinafter, same or similar elements are represented by like reference numerals and redundant detailed descriptions will be omitted. Besides, to clearly disclose the characteristics of the present invention, the elements in the figures are not drawn to scale.

FIG. 1 illustrates an enlarged view of part of a secondary battery 2 according to a first embodiment of the present invention. As illustrated in FIG. 1, the secondary battery 2 includes at least one first metal plate 20 serving as a positive terminal, at least one second metal plate 21 serving as a negative terminal, and a separator material 22 disposed between the at least one first metal plate 20 and the at least one second metal plate 21 for separating a positive terminal material layer 200 coated on the at least one first metal plate 20 and a negative terminal material layer 210 coated on the at least one second metal plate 21. It is to be noted that the secondary battery 2 further includes a shell as represented by dash lines in FIG. 7, where the at least one first metal plate 20, the at least one second metal plate 21, and the separator material 22 are folded and accommodated in the shell.

Figure 2:
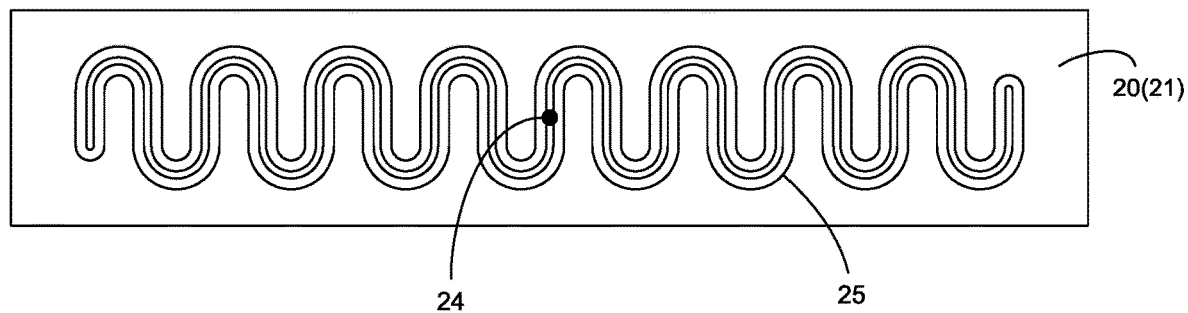
FIG. 2 is an illustrative view of a metal plate and a coil pattern of a secondary battery of the present invention.
Figure 3:
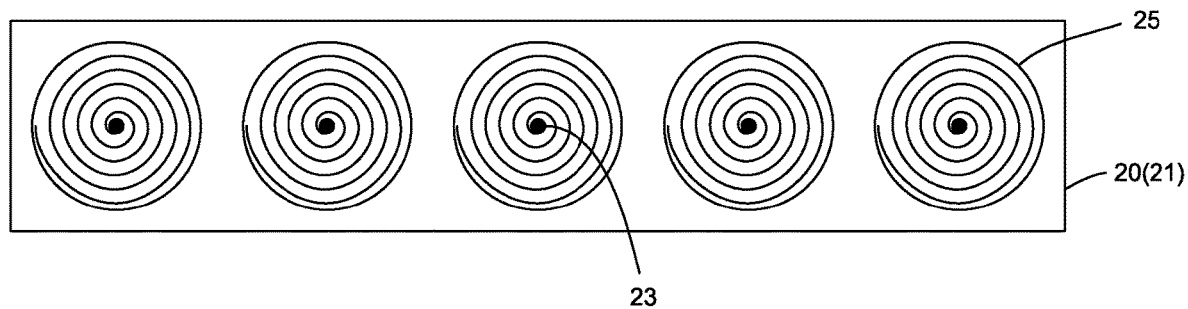
FIG. 3 is another illustrative view of a metal plate and a coil pattern of a secondary battery of the present invention.
Figure 8:
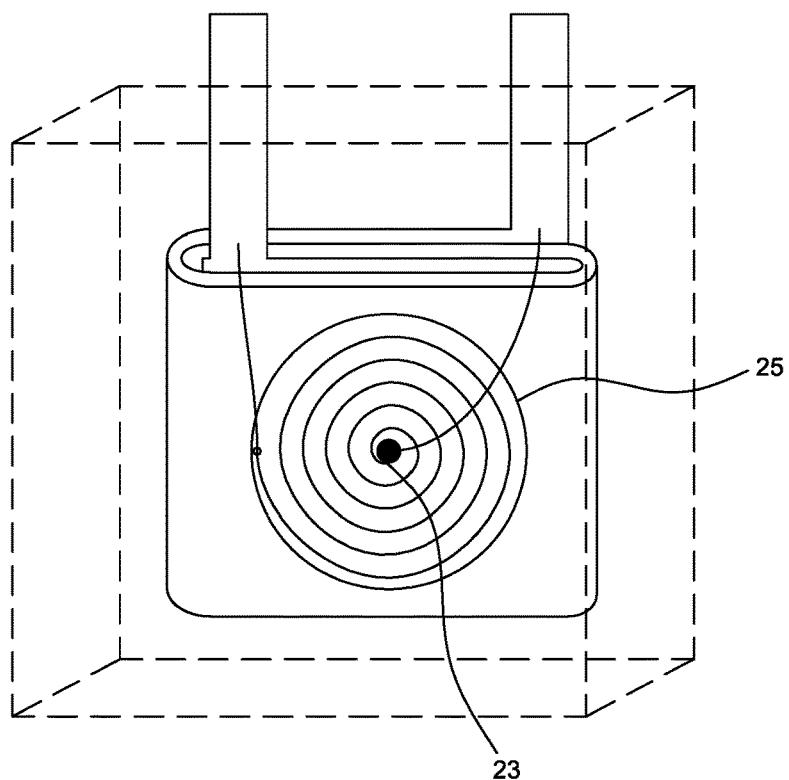
FIG. 8 is an illustrative view of a secondary battery according to an embodiment of the present invention.

In this embodiment, with reference to FIGS. 2, 3, and 8, the secondary battery 2 further includes within the shell a liquid electrolyte 23 and an integrated circuit 24 for controlling a wireless communication of RFID (radio frequency identification), WIFI, NFC (near field communication), Blue-tooth, or SRI (short range interaction). Besides, the at least one first metal plate 20 and/or the at least one second metal plate 21 has formed thereon a coil pattern 25, which is connected with the integrated circuit 24 and can be an antenna coil pattern 25, a charging and discharging coil pattern 25 for electromagnetic wave induction or electric field induction, an acoustic antenna coil pattern 25, a charging and discharging coil pattern 25 for audio wave induction, and a charging and discharging coil pattern 25 for X-ray induction or laser light induction, so that an energy transfer can take place between the positive terminal and the negative terminal. The integrated circuit 24 is used to control the energy transfer. It can also to be seen from FIGS. 2, 3, and 8 that the coil pattern can take different shapes.

Figure 4:
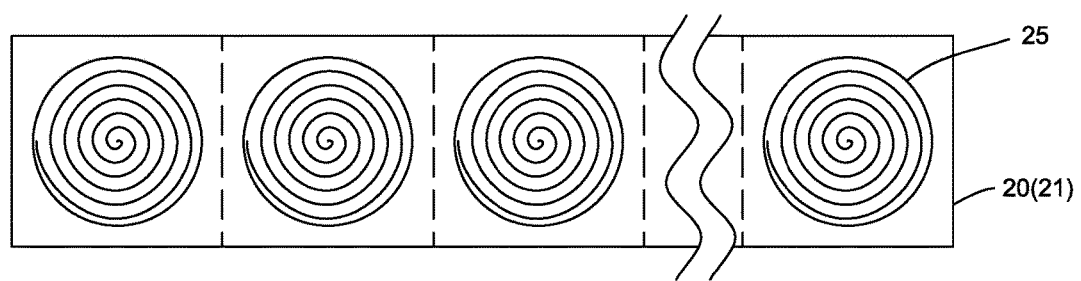
FIG. 4 is an illustrative view of a metal plate and a Tesla coil of a secondary battery of the present invention.
Figure 9:
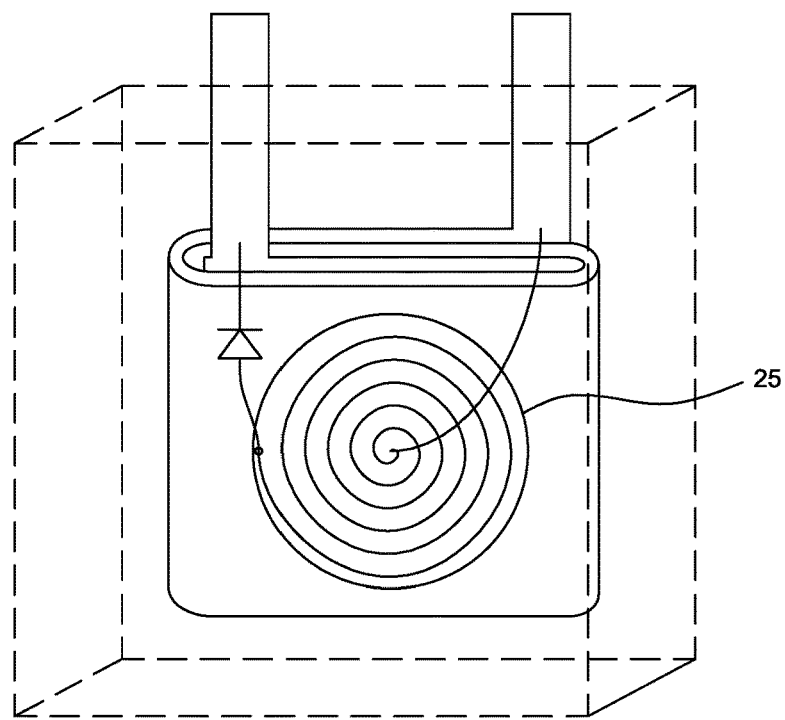
FIG. 9 is an illustrative view of a secondary battery according to another embodiment of the present invention.

Please refer to FIGS. 4 and 9, where, different from the embodiments of FIG. 2 and FIG. 3, the at least one first metal plate 20 and/or the at least one second metal plate 21 has formed thereon a Tesla coil 25 and the integrated circuit 24 is omitted. The Tesla coil 25 generates a charging power to the at least one first metal plate 20 by electromagnetic field induction or electric field induction.

Please refer to FIG. 5(*a*), where, different from the first preferred embodiment, the separator material and the liquid electrolyte are omitted, and the secondary battery includes an ionic crosslinking material 26 within both the positive terminal material layer 200 on the at least one first metal plate 20 and the negative terminal material layer 210 on the at least one second metal plate 21. Nevertheless, please refer to FIG. 5(b), where, with the separator material and the liquid electrolyte installed, the secondary battery can also include the ionic crosslinking material 26 within both the positive terminal material 200 on the at least one first metal plate 20 and the negative terminal material 210 on the at least one second metal plate 21.

FIG. 6(a)-6(c) illustrates variations of the embodiments of the at least one first metal plate 20 and the at least one second metal plate 21 of the secondary battery of the present invention. In FIG. 6(a), the metal plate 20(21) has one positive (negative) terminal material layer 200(210) coated on both opposite surfaces thereof to provide a 1D (one deposition layer) structure; in FIG. 6(b), the metal plate 20(21) has two positive (negative) terminal material layers 200(210) coated on both opposite surfaces thereof to provide a 2D (two deposition layers) structure; and in FIG. 6(c), the metal plate 20(21) has three positive (negative) terminal material layers 200(210) coated on both opposite surfaces thereof to provide a 3D (three deposition layers) structure. As a capacitance formula thereof can be expressed as $C=\varepsilon(A/d)$, where C is a capacitance value, $\varepsilon$ is a dielectric constant, A is an overlap area of two parallel plates, and d is a separation between the two parallel plates, and simplified to $C=A$ by letting $\varepsilon=d=1$, therefore the current density of the secondary battery can be increased by increasing the surface area of the positive (negative) terminal material layers, and the energy density of the secondary battery can be greatly improved. Besides, the ionic crosslinking material 26 can be implemented by metal or non-metal conductive material in the form of particles and enclosed by UV (ultraviolet) glue, PVDF (polyvinylidene fluoride) glue, CMC (carboxymethyl cellulose) glue, SBR (styrene-butadiene rubber) glue, or liposomes, so as to increase the surface area of the positive (negative) terminal material layers and thereby improve the current density of the secondary battery.

Figure 7:
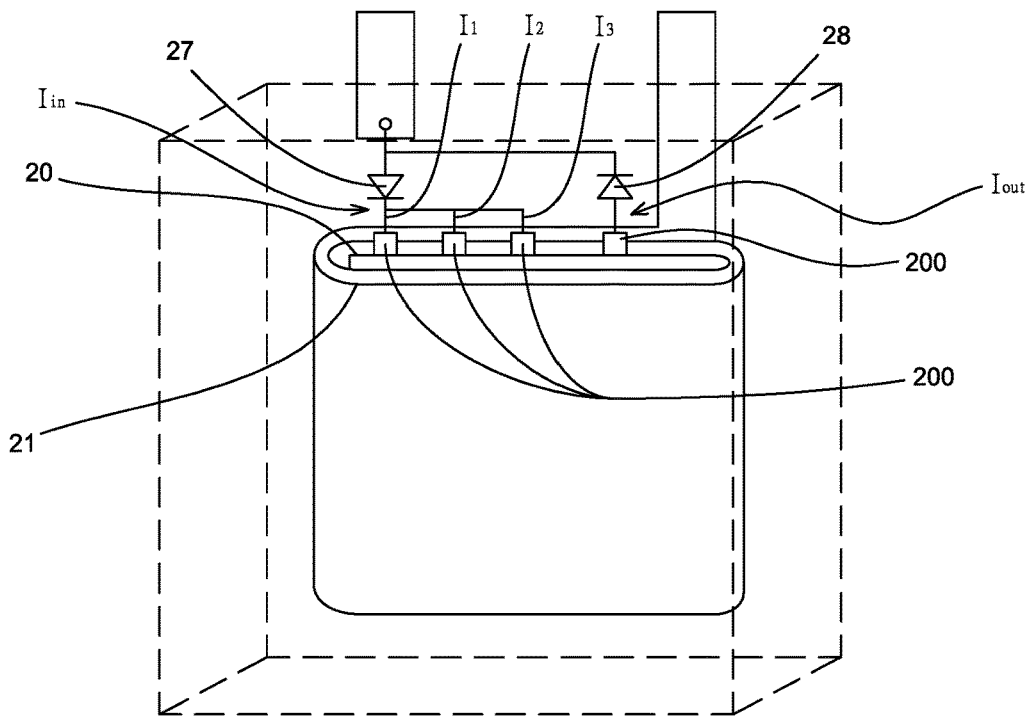
FIG. 7 is an illustrative view of a parallel connection structure for charging a secondary battery and a series connection structure for discharging the secondary battery according to an embodiment of the present invention.

FIG. 7 is an illustrative view of a secondary battery according to another embodiment of the present invention. As illustrated in FIG. 7, the first metal plate 20 and the second metal plate 21 are folded and accommodated in a shell (represented by dash lines). Different from the prior embodiment, this embodiment implements a secondary battery having a first diode 27 and a second diode 28, and four electrode contacts 200 included in the first metal plate 20. The first diode 27 has an N (cathode) terminal connected to three of the four electrode contacts 200 and a P (anode) terminal serving as an input terminal, so that an input current Iin can be divided into three branches as represented by Iin=I1+I2+I3, where I1, I2, and I3 are respective branch currents. The second diode 28 has an N (cathode) terminal connected to the P terminal of the first diode 27, and a P (anode) terminal connected to the rest of the four electrode contacts 200, so as to provide an output current Iout=I1=I2=I3, which is a single branch current. With this arrangement, the secondary battery can be charged through parallel current paths and discharged through a series current path.

Figure 10:
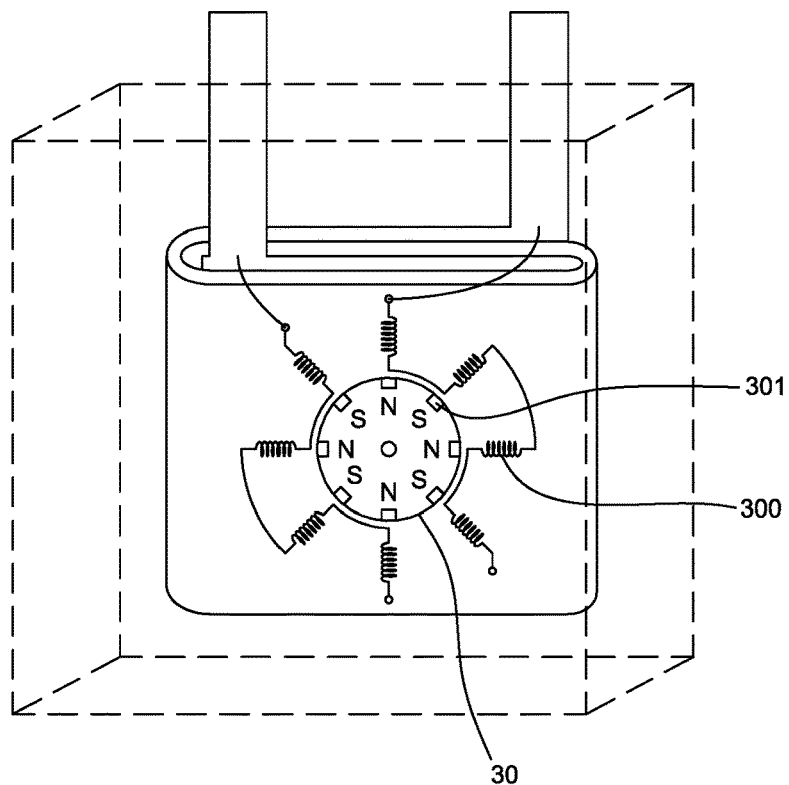
FIG. 10 is an illustrative view of a secondary battery according to another embodiment of the present invention.

FIG. 10 is an illustrative view of a secondary battery according to still another embodiment of the present invention. Different from the embodiments of FIGS. 8 and 9, this embodiment implements a secondary battery having a flywheel generator 30. The flywheel generator 30, including plural coils 300 and magnetic poles 301, can be formed on the first metal plate 20 and/or the second metal plate 21, so that the flywheel generator 30 can be activated to provide a charging power to the first metal plate 20 when a charging current flows in the secondary battery or when the flywheel generator 30 experiences an external electro-magnetic field induction.

Figure 11:
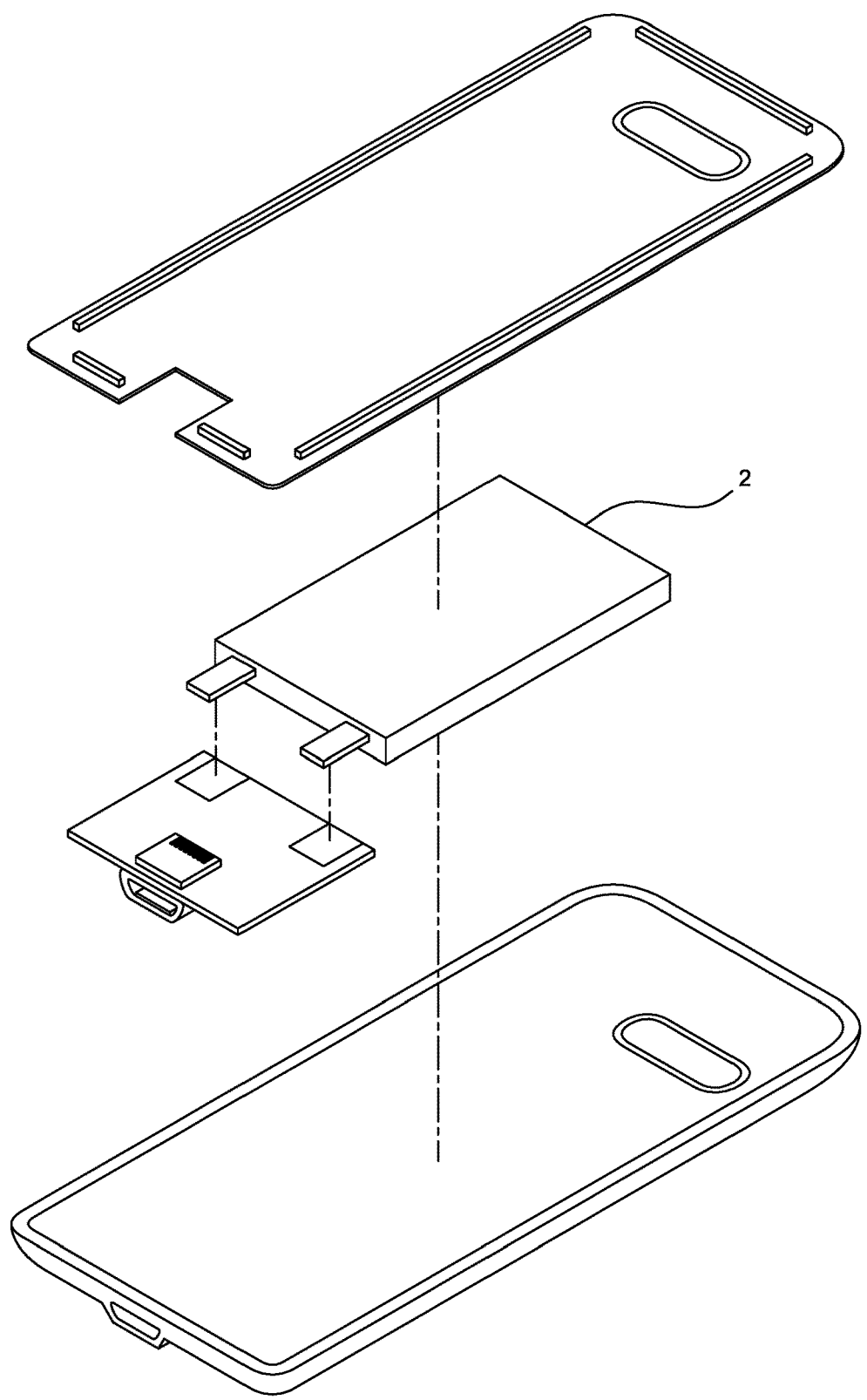
FIG. 11 illustrates an exploded view of a device using a secondary battery of the present invention.

FIG. 11 illustrates an exploded view of a device using a secondary battery of the present invention. As illustrated in FIG. 11, the secondary battery 2 is disposed inside a cell phone protector case so that, when the cell phone is put in the cell phone protector case, the secondary battery 2 connects electrically with a cell phone and can be activated to power the cell phone when there is a need. It is to be noted that, the application of the secondary battery of the present invention is not limited to the device of FIG. 11. In fact, the secondary battery 2 of the present invention can be applied to any device that needs a secondary battery, including but not limited to electric car, electric motorcycle, notebook computer, tablet computer, cell phone, robot, etc.

Figure 12:
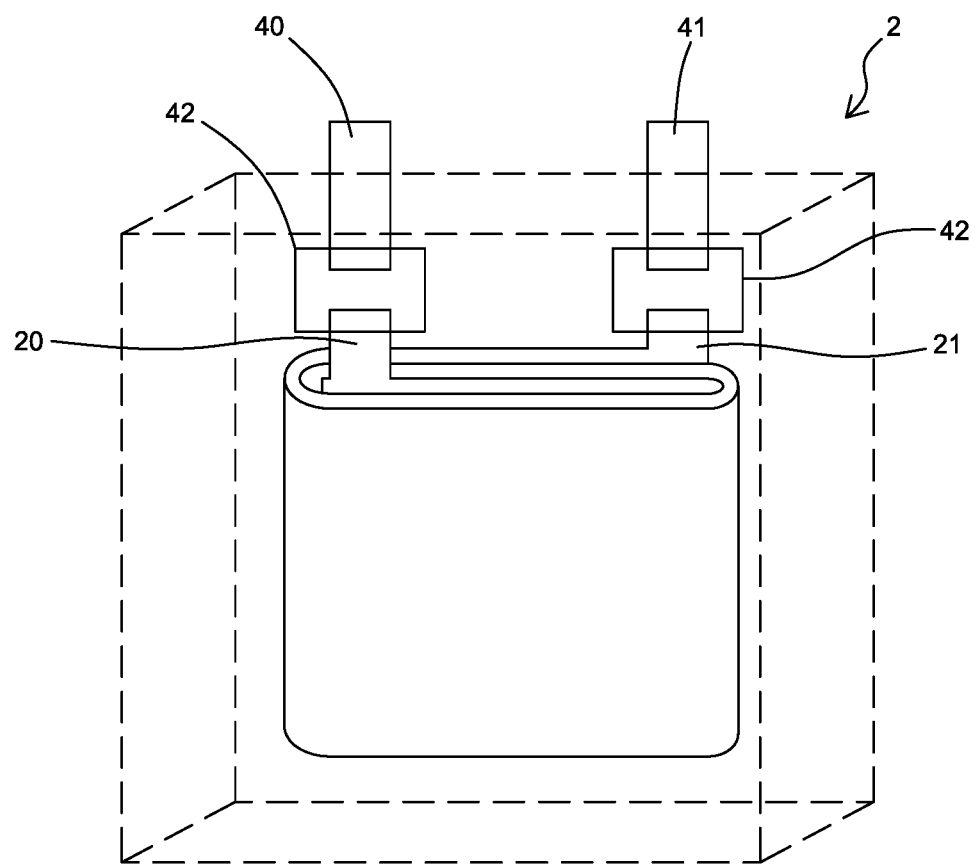
FIG. 12 is an illustrative view of a secondary battery according to still another embodiment of the present invention.

FIG. 12 is an illustrative view of a secondary battery according to still another embodiment of the present invention. In this embodiment, the secondary battery 2 further includes a positive terminal contact 40 extending out of the shell (represented by dash lines) and a negative terminal contact 41 extending out of the shell for connecting electrically with an external circuit (not shown in the figure), and a pair of fuses 42, one of the pair of fuses 42 connecting electrically between the positive terminal contact 40 and the first metal plate 20, and the other of the pair of fuses 42 connecting electrically between the negative terminal contact 41 and the second metal plate 21. The fuse 42 can be implemented by a glue material doped with high conductive metal particles, the glue material having a higher thermal expansion coefficient than the high conductive metal particles. When an ambient temperature is higher than a preset threshold, the glue material will expand much more than the high conductive metal particles to cause the pair of fuses 42 to lose electrical conductivity to disrupt an electrical connection between the positive terminal contact 40 and the first metal plate 20, and an electrical connection between the negative terminal contact 41 and the second metal plate 21. When the ambient temperature is cooled down to below the threshold, the glue material and the high conductive metal particles will return to original states to restore the electrical connection between the positive terminal contact 40 and the first metal plate 20, and the electrical connection between the negative terminal contact 41 and the second metal plate 21. The preset threshold can be any temperature between 20° C. and 200° C.

It is to be noted that the fuse 42 can also be implemented with two metals of different thermal expansion coefficients in contact with each other, so that the fuse 42 can become non-conductive when an ambient temperature exceeds a preset threshold to cause the two metals to expand differently to an extent to make the two metals not in contact, and the fuse 42 can become conductive when the ambient temperature is cooled down to below the preset threshold to restore the two metals to being in contact with each other.

In conclusion, with the structures and devices disclosed above, the secondary battery of the present invention does achieve the objectives and offer expected functions and results. Besides, as the present invention is not found in publications or used in public according to applicant's knowledge, therefore, the present invention is believed to comply with all patentable requirements.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A secondary battery, including:
a shell;
at least one first metal plate connected to a positive terminal;
at least one second metal plate connected to a negative terminal;
a separator material disposed between the at least one first metal plate and the at least one second metal plate for separating a positive terminal material on the at least one first metal plate and a negative terminal material on the at least one second metal plate;
a liquid electrolyte; and
an integrated circuit for controlling a wireless communication of RFID, WIFI, NFC, Blue-tooth, or SRI,
wherein, a coil pattern is formed on a surface of at least one of the at least one first metal plate and the at least one second metal plate, the coil pattern being selected from a group consisting of an antenna coil pattern, a charging and discharging coil pattern for electromagnetic wave induction or electric field induction, an acoustic antenna coil pattern, a charging and discharging coil pattern for audio wave induction, and a charging and discharging coil pattern for X-ray induction or laser light induction, so that an energy transfer can take place between the positive terminal and the negative terminal, and wherein, the integrated circuit controls the energy transfer;
wherein the at least one first metal plate, the at least one second metal plate, and the integrated circuit are located in the shell.

2. A secondary battery, including:
a shell;
at least one first metal plate connected to a positive terminal;
at least one second metal plate connected to a negative terminal;
an ionic crosslinking material being metal particles or non-metal conductive material particles enclosed by UV glue, PVDF glue, CMC glue, SBR glue, or liposomes, and included both in a positive terminal material layer on the at least one first metal plate and in a negative terminal material layer on the at least one second metal plate; and
an integrated circuit for controlling a wireless communication of RFID, WIFI, NFC, Blue-tooth, or SRI,
wherein, a coil pattern is formed on a surface of at least one of the at least one first metal plate and the at least one second metal plate, the coil pattern being selected from a group consisting of an antenna coil pattern, a charging and discharging coil pattern for electromagnetic wave induction or electric field induction, an acoustic antenna coil pattern, a charging and discharging coil pattern for audio wave induction, and a charging and discharging coil pattern for X-ray induction or laser light induction, so that an energy transfer can take place between the positive terminal and the negative terminal, and wherein, the integrated circuit controls the energy transfer;
wherein the at least one first metal plate, the at least one second metal plate, and the integrated circuit are located in the shell.

* * * * *